United States Patent [19]

Kern

[11] Patent Number: 4,610,196

[45] Date of Patent: Sep. 9, 1986

[54] AIR SUPPLY NOZZLE

[75] Inventor: Alfred Kern, Schneeberg, Fed. Rep. of Germany

[73] Assignee: Aurora Konrad G. Schulz GmbH & Co., Mudau, Fed. Rep. of Germany

[21] Appl. No.: 696,360

[22] Filed: Jan. 30, 1985

[30] Foreign Application Priority Data

Jan. 30, 1984 [DE] Fed. Rep. of Germany ....... 3403084

[51] Int. Cl.⁴ .................... B60H 1/00; F24F 13/04
[52] U.S. Cl. .................................. 98/2; 98/2.09; 98/40.02; 98/40.18
[58] Field of Search ............... 98/2, 2.04, 2.05, 2.08, 98/2.09, 2.19, 40.18, 40.02, 41 R

[56] References Cited

U.S. PATENT DOCUMENTS 3,264,971 8/1966 Dangauthier ........................... 98/2
4,163,415 8/1979 Neveux ............................... 98/2.09

FOREIGN PATENT DOCUMENTS 2507856 9/1976 Fed. Rep. of Germany ..... 98/40.02
2628663 12/1977 Fed. Rep. of Germany ..... 98/40.02
2910125 9/1980 Fed. Rep. of Germany ..... 98/40.27
1155757 5/1958 France ............................ 98/40.18

Primary Examiner—Henry C. Yuen
Attorney, Agent, or Firm—Becker & Becker, Inc.

[57] ABSTRACT

A ventilating or air supply nozzle for panes, especially windshields, and at least one portion of the interior of a passenger vehicle or a driver's cab. The nozzle has an air inlet connection for fresh air and/or recirculated air, and an air outlet opening. The nozzle also includes a swivel damper which is pivotably mounted about an axis within a housing, and is provided with curved guide elements or deflectors. In order to be able to rapidly deice the windshield, the plane of the air outlet opening extends at an obtuse angle relative to the axis of the air inlet connection. The width of the free cross-sectional area of the air outlet opening is at least as great as the width of the cutting plane of the projection of the air inlet connection with the plane of the air outlet opening. A housing portion which is in the shape of a circular arc essentially covers the obtuse angle. The pivot axis of the swivel damper is disposed on that side disposed across from the housing portion.

3 Claims, 4 Drawing Figures

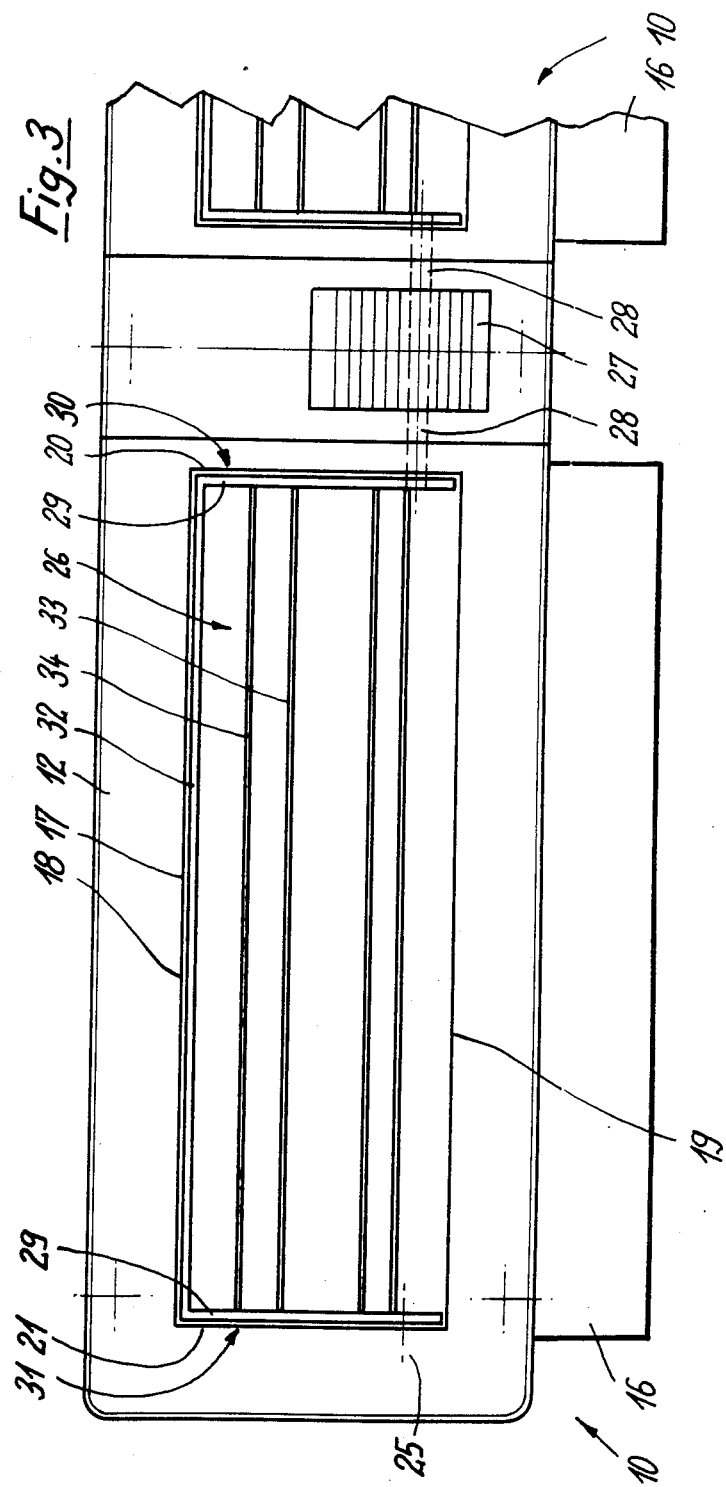

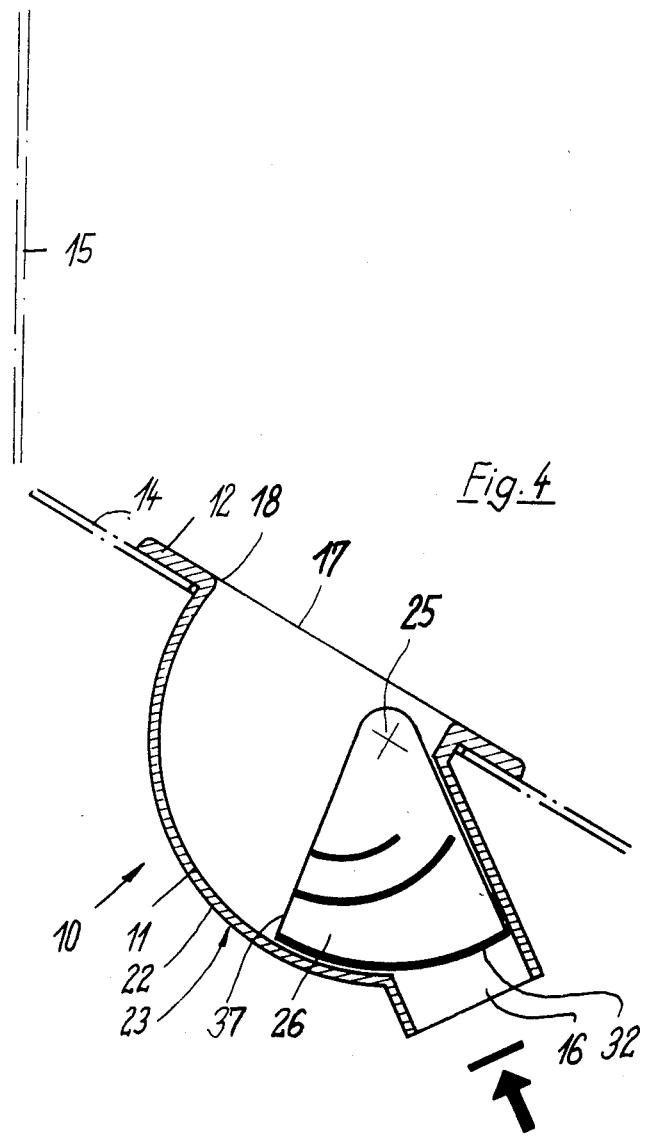

AIR SUPPLY NOZZLE

BACKGROUND OF THE INVENTION

1. Field of the Invention

The present invention relates to a ventilating or air supply nozzle for panes, especially window panes and windshields, and for at least one portion of the interior of a passenger vehicle, of a driver's compartment or cab of a commercial vehicle, of construction machinery, or the like. The nozzle includes a housing which is provided with an air inlet connection, for either heated or cooled fresh air and/or recirculated air, and an air outlet opening. A swivel damper, which is provided with curved guide elements or deflectors, is pivotably mounted in the housing about an axis which extends essentially parallel to the pane.

2. Description of the Prior Art

Pursuant to one heretofore known air supply nozzle of this general type, as disclosed in U.S. Pat. No. 3,264,971 Dangauthier, dated Aug. 9, 1966, the air inlet connection is provided with a horizontal air outlet opening, the plane of which extends at right angles to the direction of flow; this air outlet opening opens in a horizontal section of the panel disposed above the dashboard of an automobile. Mounted directly below the air outlet opening in the air inlet connection is a swivel damper, the pivot axis of which is disposed near one wall of the air inlet connection. The swivel damper is sector-shaped, and has a plurality of concentrically curved guide elements. If a fogged-up or iced-up windshield is to be cleared, the swivel damper is completely introduced into the air inlet connection, in which connection the continuous guide elements strongly throttle the exiting flow. As a result, for example in winter for deicing the windshield, the entire heat output is not available, so that the deicing process takes a relatively long period of time, and a lot of fuel has to be needlessly consumed before one can drive away. This drawback can be compensated for only by stronger blowers; however, this increases the noise level, and results in higher manufacturing costs.

In contrast, an object of the present invention is to provide a ventilating or air supply nozzle with which it is possible to quickly deice in particular the windshield, even with a relatively low blower output, as is available in cabs for commercial vehicles, construction machinery, etc.

BRIEF DESCRIPTION OF THE DRAWINGS

This object, and other objects and advantages of the present invention, will appear more clearly from the following specification in conjunction with the accompanying drawings, in which:

FIG. 3 is a view taken in the direction of arrow III in FIG. 1, and shows two nozzles; and FIG. 4 is another schematic cross-sectional view that shows a further inventive embodiment of an air supply nozzle in the blocking position.

SUMMARY OF THE INVENTION

Figure 1:
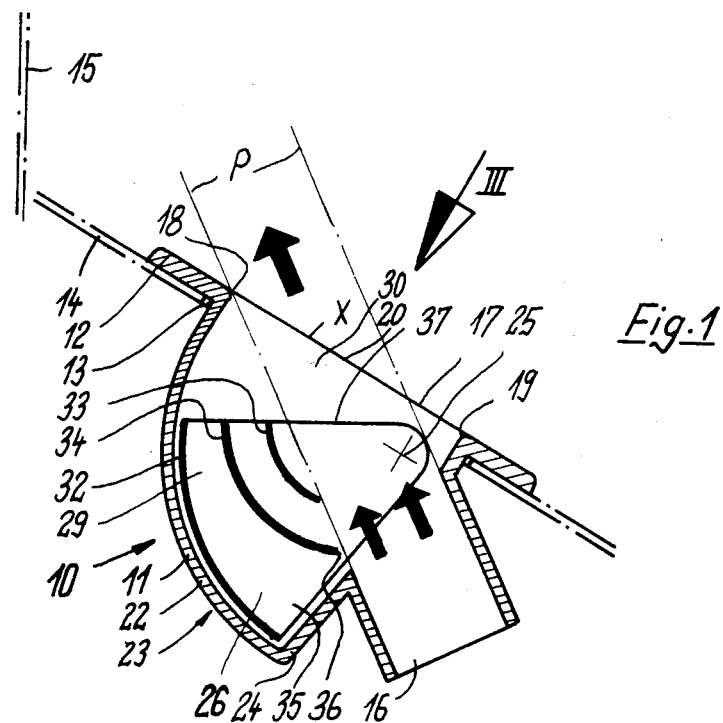
FIG. 1 is a schematic cross-sectional view taken through one inventive embodiment of an air supply nozzle in the pane-cleaning position.

The ventilating or air supply nozzle of the present invention is characterized primarily in that the plane of the air outlet opening extends at an obtuse angle to the axis of the air inlet connection; in that the width of the free cross-sectional area of the air outlet opening is at least as great as the cutting plane of the projection of the air inlet connection with the plane of the air inlet opening; in that one edge of the air outlet opening forms the generating line for a housing portion which has the shape of a circular arc and essentially covers the obtuse angle; and in that the pivot axis of the swivel damper is disposed in the vicinity of the opposite edge of the air outlet opening.

The advantage achieved with the nozzle of the present invention is that the entire ventilation output which enters the housing through the air inlet connection is delivered through the air outlet opening when the air supply nozzle, i.e. the swivel damper thereof, is in the pane-cleaning position. Furthermore, it is possible to deflect the heated or cooled fresh air and/or recirculated air onto the driver or passenger essentially without loss of output. This is so because the guide elements or deflectors of the swivel damper reduce losses within the housing caused by deflection and turbulence to a negligible minimum, so that a completely satisfactory ventilation of the driver or passenger compartment is assured by the nozzle, even if it only has a small air or cooling or heating output. The swivel damper can be adjusted in various positions for ventilating the compartment. The swivel damper can be held in these positions in order in this manner to act more intensely upon the head region or any other region of the driver or passenger of an automobile, a commercial vehicle, or construction machinery.

Pursuant to advantageous specific embodiments of the present invention, a continuous peripheral wall may be provided between the free ends of sector-shaped end walls of the swivel damper; this peripheral wall may be curved concentrically relative to the pivot axis of the swivel damper, and may cover an arc having an acute apex angle. The swivel damper may be provided with at least one curved guide element or curved deflector which is disposed between the pivot axis and the peripheral wall. The curved deflector may be spaced from the pivot axis of the swivel damper by such a distance that when the swivel damper is pivoted into the housing portion, the deflector is disposed beyond the projection of the air inlet connection.

The air outlet opening may be rectangular, and the surface of the circular-arc-like housing portion, as well as the peripheral wall and the deflector of the swivel damper, may be concentrically curved. A further guide element or deflector may be provided adjacent to the peripheral wall. This further deflector may have essentially the same length as the peripheral wall, yet is curved differently from this wall and forms together therewith a channel which tapers in the manner of a nozzle. The first deflector, which is adjacent to the pivot axis of the swivel damper, may be considerably shorter than the further deflector which is adjacent to the peripheral wall.

The housing portion may have a wall which extends essentially radially and parallel to the pivot axis of the swivel damper. The air inlet connection passes through this wall, which forms an abutment or stop for the swivel damper in the pane-cleaning position of the latter. Alternatively, the generating line of the housing portion may extend all the way to the air inlet connection, which then passes through the surface of the housing portion.

The housing may be made of plastic, and the swivel damper may also be a plastic part.

In alignment with a pivot axis thereof, the swivel damper may be provided with at least one pivot pin or pivot shaft, on which, beyond the housing portion, a control member may be seated. The swivel damper may be adapted to be fixed in various positions for ventilating the vehicle compartment. At least two nozzles may be provided which are coaxially disposed next to one another, with the pivot pins or pivot shafts for both of these nozzles being provided with a common control member.

Although the air outlet opening is preferably rectangular, the air outlet opening can also be essentially semicircular. The air guide elements or deflectors are then correspondingly shaped, and are curved relative to the axis. Such a nozzle, and also a nozzle having a square air outlet opening, can be satisfactorily placed in the corners of cabs.

DESCRIPTION OF PREFERRED EMBODIMENTS

Figure 2:
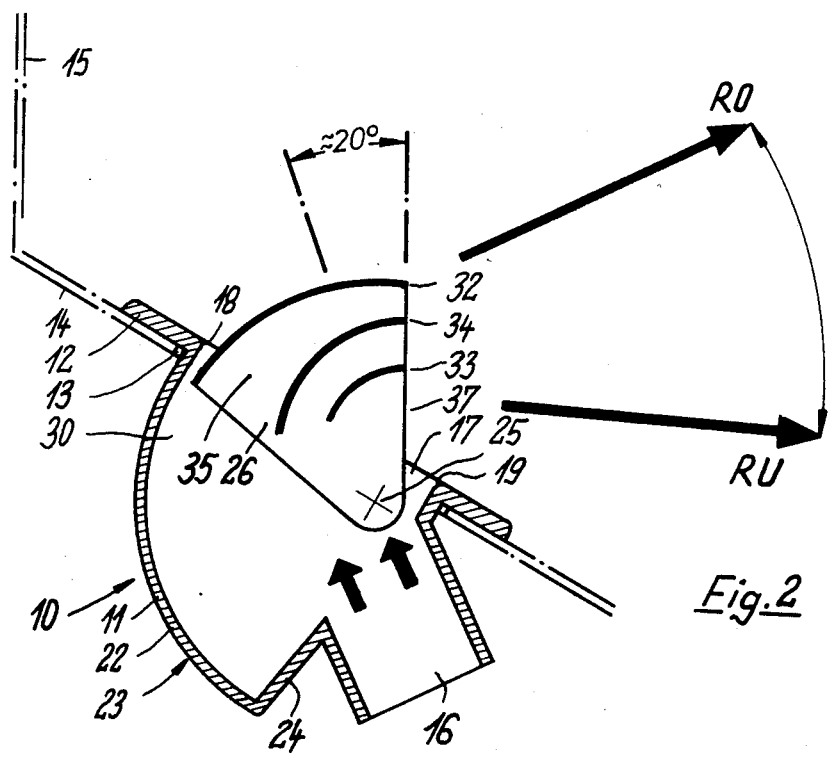
FIG. 2 is another schematic cross-sectional view that shows the air supply nozzle of FIG. 1 in a position for ventilating the vehicle compartment.

Referring now to the drawings in detail, the ventilating or air supply nozzle, indicated generally by the reference numeral 10, comprises a housing 11 having a mounting flange 12. As shown in FIGS. 1, 2, and 4, the flange 12 serves for mounting the nozzle 10 in the opening 13 of a wall or panel 14, which is adjacent to a pane 15. The pane 15 is generally a windshield, but can also be a side window pane, which is to be kept free of ice and fog. The wall 14 can be the covering of the dashboard of an automobile or truck.

The housing 11 has an air inlet connection 16, which can be connected to a conduit or directly to a unit which supplies heated or cooled fresh air and/or recirculated air. The mounting flange 12 encircles an air outlet opening 17, the plane of which extends at an obtuse angle to the axis of the air inlet 16. In the illustrated embodiment (see in particular FIG. 3), the air outlet opening 17 is rectangular and has two long edges 18 and 19, and two short edges 20 and 21. The distance between the long edges 18 and 19 determines the width of the free cross-sectional area of the air outlet opening 17. This width is at least as great as the cutting plane "X" of the projection "P" of the air inlet connection 16 with the plane of the air outlet opening 17.

The edge 18 of the air outlet opening 17 forms the generating line for the surface 22 of a housing portion 23; the surface 22 is in the shape of a circular arc and essentially covers the obtuse angle. The surface 22 leads to a wall 24 which extends essentially radially and parallel to an axis 25, which is disposed in the region across from the edge 19 of the air outlet opening 17 in the housing 11. The axis 25 extends essentially parallel to the pane 15, and a swivel damper 26 is journalled or mounted to pivot about the axis 25. To effect this mounting, pivot pins, pivot shafts, pin bearings, or the like can be provided on the swivel damper 26 or in the end walls 30, 31 which are connected to the short edges 20, 21 of the housing 11. In the embodiment illustrated in FIG. 3, a further ventilating or air supply nozzle 10 is coaxially disposed next to the first nozzle 10, so that a double configuration results. Disposed between the two ventilating nozzles 10, i.e. between the air outlet openings 17 thereof, there is a control member 27 which is seated on a pivot shaft 28 which is rigidly connected to the adjacent, sector-shaped end wall 29 of the swivel damper 26.

A continuous peripheral wall 32 is provided between the free ends of the sector-shaped end walls 29 of the swivel damper 26. The wall 32 is curved concentrically to the axis 25 of the swivel damper 26, and covers an arc having an acute apex angle. The peripheral wall 32 thus is movable parallel to the surface 22 of the housing portion 23.

The swivel damper 26 is provided with at least one curved guide element or deflector 33 between the axis 25 and the peripheral wall 32. The deflector 33 is spaced from the axis 25 by such an amount that when the swivel damper 26 is pivoted into the housing portion 23, the deflector is disposed beyond the projection "P" of the air inlet connection 16.

In the illustrated embodiment, as previously mentioned, the air outlet opening 17 is rectangular, so that the surface 22 of the circular housing portion 23, as well as the peripheral wall 32 and the deflector 33 of the swivel damper 26, are concentrically curved.

A further guide element or deflector 34, which is adjacent to the peripheral wall 32, is provided in the illustrated embodiment. Although the deflector 34 essentially has the same length as the peripheral wall 32, the deflector is curved differently from the latter and together with the wall 32 forms a channel 35 which tapers in the manner of a nozzle. Nevertheless, in the pane-cleaning position of the ventilating nozzle 10, i.e. of the swivel damper 26, the inlet or leading edge 36 of the deflector 34 is disposed beyond the projection "P" of the air inlet connection 16, in connection with which the deflector 33 adjacent to the pivot axis 25 is considerably shorter than the deflector 34. The obstruction-free flow in the plane-cleaning position is illustrated by arrows in FIG. 1. In this situation, the essentially radially extending wall 24 of the housing portion 23 forms an abutment or stop for the swivel damper 26.

In the embodiment illustrated in FIG. 4, the generating line of the surface 22 extends from the edge 18 all the way to the air inlet 16, which passes through the surface 22 of the housing portion 23. In this manner, the peripheral wall 32 of the swivel damper 26 can block the air inlet 16, resulting in a draft-free blocking position for the ventilating nozzle 10. In this embodiment, means for retaining the swivel damper 26 in the pane-cleaning position can be provided. For example, one of the end walls 30, 31 of the housing 11, and/or the sector-shaped end wall 29 of the swivel damper 26, can be provided with projections which are adapted to engage one another. Appropriate retaining means, or a friction surface, can also be provided in order to be able to fix the swivel damper 26 in various positions, between the arrows RU and RO, for ventilating or supplying air to the vehicle compartment. The region between the arrows RU and RO corresponds to an adjustment of the outlet edge 37 of the swivel damper 26 by about 20°, as indicated in FIG. 2. All of the means for holding the swivel damper 26 in a given position can also be associated with the control member 27.

The housing 11 is preferably made of plastic. The swivel damper 26 also preferably is made of plastic, and the pivot pins can be integrally formed on the sector-shaped end wall 29 of the damper 26.

The obtuse angle between the plane of the air outlet opening 17 and the axis of the air inlet connection 16 is preferably 140°. The acute angle of the swivel damper 26 is approximately 50°.

The present invention is, of course, in no way restricted to the specific disclosure of the specification and drawings, but also encompasses any modifications within the scope of the appended claims.

What I claim is:

1. In an air supply nozzle for panes, especially window panes and windshields, and for at least one portion of the interior of a vehicle; said nozzle including a housing which has a an air inlet connection, for fresh air and/or recirculated air, and an air outlet opening; said air inlet connection having a predetermined cross-sectional area of air flow, said housing being provided with a swivel damper, which is disposed at least in part between said air inlet connection and said air outlet opening, and being pivotably mounted about a pivot axis which extends essentially parallel to said pane; said swivel damper being provided with at least one curved air deflector which extends essentially in the form of a first circular arc, said swivel damper being movable to a first position for allowing the air flow in essentially the same direction as the direction of air flow in the air inlet connection and being movable to a second position for allowing the air flow in a direction which is transverse to the direction of air flow in the air inlet connection, a flow path being provided between said air inlet connection and said air outlet opening, the improvement therewith comprising said air deflector, in said first position, being swiveled out of the flow path in such a way that the air flow in said air outlet opening is unhindered and has the full cross-sectional area of said air flow in said air inlet connection, and, in said first position, said flow path being essentially straight; said housing having a housing portion which has the cross-sectional shape of a second circular arc; said second circular arc being coaxial with said first circular arc, said housing portion being formed in such a way that, in said first position, said air deflector is received in said housing portion completely; said swivel damper comprising two sector-shaped end walls which effect said pivot mounting of said swivel damper, and which have free arc-shaped ends remote from said pivot axis; said free ends being interconnected by a continuous peripheral wall, which extends between said ends and is curved concentric to said pivot axis of said swivel damper; said peripheral wall covering an arc having an acute apex angle; said swivel damper being provided with a first curved air deflector, which is disposed between said peripheral wall and said pivot axis, and between said sector-shaped end walls; said first curved air deflector being disposed at such a distance from said pivot axis of said swivel damper, that when the latter is pivoted into said housing portion, said first deflector is disposed beyond said projection of said air inlet connection; said air inlet opening being rectangular; said housing portion, said peripheral wall, and said first curved air deflector being concentrically curved; said swivel damper being provided with a second curved air deflector, which is disposed between said peripheral wall and said first deflector, and between said sector-shaped end walls; said second deflector, when viewed in cross-section, having essentially the same length as said peripheral wall, but having a different curvature than does the latter; said second deflector and said peripheral wall together defining a channel which, in the direction away from said air inlet connection, tapers in the manner of a nozzle; said first curved air deflector, when viewed in cross-section being considerably shorter than said second curved air deflector; said swivel damper being provided with at least one pivot means aligned with its pivot axis; and including a control member which is seated on said pivot means externally of said housing portion; and means for holding said swivel damper in different pivot positions for supplying air to the interior of said vehicle.

2. An air supply nozzle according to claim 1, in which said housing portion is provided with an essentially radially extending wall, the plane of which extends parallel to said pivot axis of said swivel damper; said air inlet connection is provided in said wall, which forms a stop for said swivel damper in the pane-clearing position of the latter.

3. An air supply nozzle according to claim 1, in which said housing portion extends as far as said air inlet connection, which is provided in the former.

* * * * *